Dec. 9, 1952 — J. W. BARKER — 2,621,148
ART OF CONVERTING HYDROCARBON MATERIAL
Filed Dec. 31, 1947 — 2 SHEETS—SHEET 1
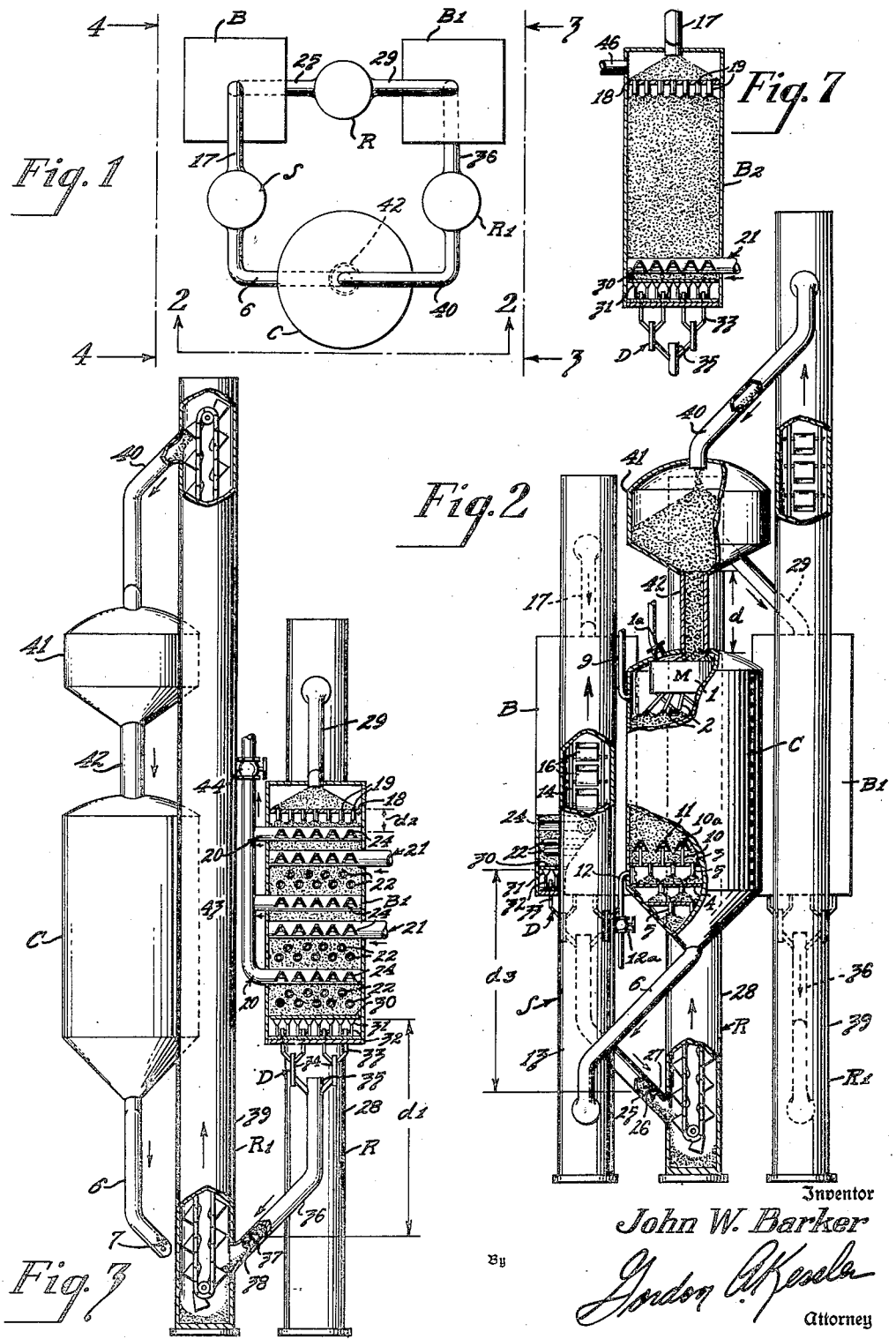
Inventor
John W. Barker
By Gordon A. Keseler
Attorney

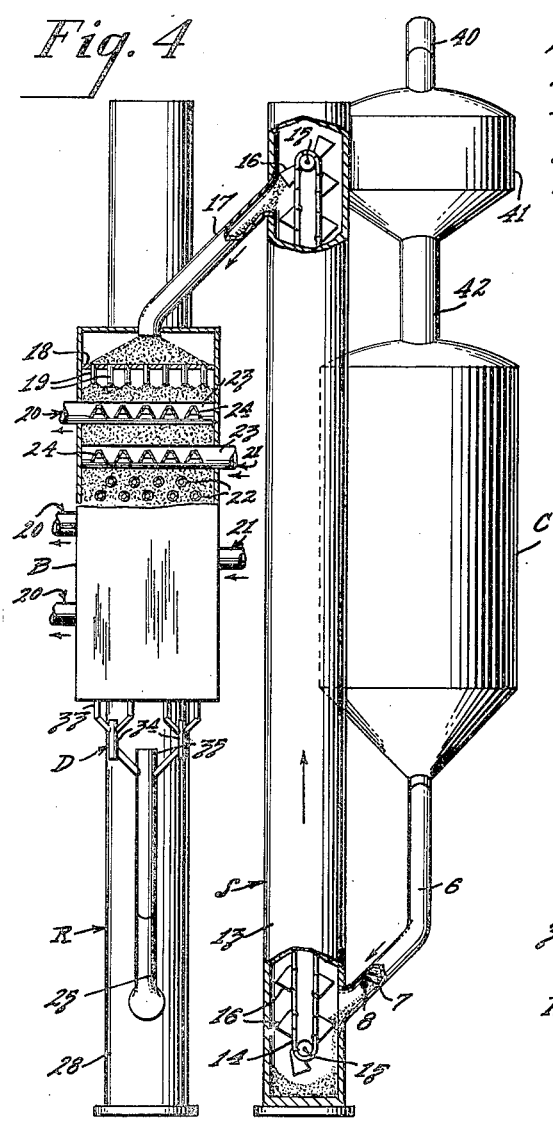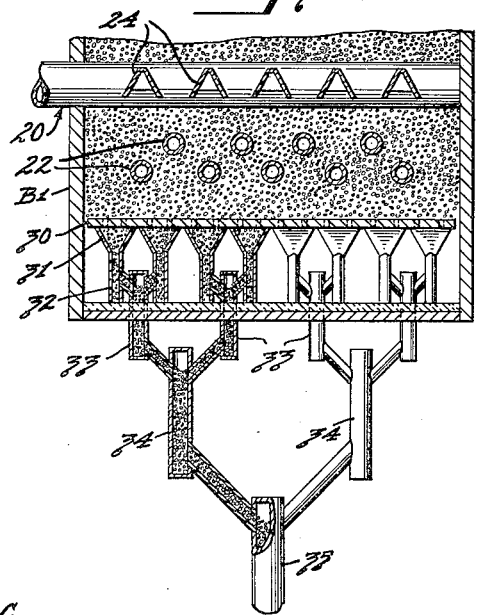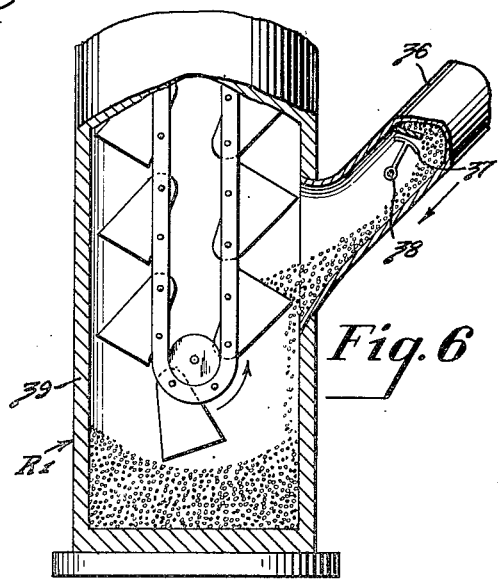

Patented Dec. 9, 1952

2,621,148

UNITED STATES PATENT OFFICE 2,621,148

ART OF CONVERTING HYDROCARBON MATERIAL

John W. Barker, Mount Vernon, N. Y., assignor to Houdry Process Corporation, Wilmington, Del., a corporation of Delaware Application December 31, 1947, Serial No. 795,014

5 Claims. (Cl. 196—52)

My invention relates to the art of converting hydrocarbon material in the presence of contact material which moves successively through a conversion or reaction zone and a regenerating zone.

In hydrocarbon conversion systems of known character, regenerated contact material is admitted to a conversion or reaction housing after passage thereof along a path communicating with the upper portion of said housing. After admission to the housing, the contact material gravitates therethrough in solid bed fashion and, as the conversion operation proceeds, a hydrocarbon vapor or back pressure is developed interiorly of said upper housing portion. In order to prevent passage of these vapors along the aforesaid path, it is customary for a gaseous sealing medium to be admitted to the upper housing portion where, for the purpose stated, it is maintained at pressure slightly exceeding that of the hydrocarbon vapors. The major portion of this sealing medium flows, countercurrent as regards the path-following contact material, along a portion of said path which is sealed throughout the length thereof. Prior to the present invention, various proposals have been advanced for subjecting said sealing medium to pressure drop sufficient to maintain it at the pressure referred to above.

In accordance with one important aspect of the invention disclosed in this application, the aforesaid sealed path, one end of which communicates with the upper portion of the conversion housing, is extended so that the other end thereof terminates interiorly of a regenerating housing which, in suitable manner, is pressurized in the sense that the pressure interiorly thereof is maintained to suitable extent in excess of that of the atmosphere, this excess pressure effect serving as regards maintenance, in the upper portion of the conversion housing, of the necessary pressure which should be there developed by the described sealing medium. More particularly, the aforesaid excess pressure effect may be utilized in a supplementary manner for the purpose stated, this being true because, preferably, the sealed path includes one or more zones through which the contact material gravitates in solid column fashion to thereby subject the sealing medium to pressure drop sufficient to partly maintain it at the pressure magnitude referred to above.

The pressurized housing referred to above may be one wherein the entire regenerating operation is effected or, in accordance with another important aspect of my invention, the regenerating zone may be defined by a pair of regenerating housings through which the contact material passes in succession, the housing last traversed by said contact material being pressurized for the purpose stated.

Aside from the pressurized housing phase of the invention referred to above, utilization of a pair of regenerating housings is otherwise advantageous. Thus, with an arrangement of this character, partial regeneration may be effected in the housing first traversed by the contact material and regeneration may be completed, to a desired extent, in the housing last traversed by said contact material. Accordingly, removal of deposited carbonaceous material from the contact material is effected by stages, this being advantageous for the reasons hereinafter stated. Moreover, when a pair of regenerating housings are utilized as aforesaid, they may be disposed generally in side-by-side relation with resultant decrease to substantial extent in the over-all height of the complete conversion-regenerating system compared with prior practice.

Various other objects and advantages of my invention will become apparent from the following detailed description.

My invention resides in the art of converting hydrocarbon material, the method of sealing hydrocarbon conversion housings, plural regenerating housing arrangements, features and arrangements of the character hereinafter described and claimed.

For an understanding of my invention and for an illustration of one form of apparatus with which the invention may be practiced, reference is to be had to the accompanying drawings in which:

Fig. 1 is a plan view showing a conversion-regenerating system of the invention;

Figs. 2, 3 and 4 are elevational views, partly in section, taken on the respective lines 2—2, 3—3 and 4—4 of Fig. 1 looking in the direction of the arrows;

Fig. 5 is an enlarged, vertical sectional view, partly in elevation, showing a draw-off arrangement for discharging contact material from a regenerating housing;

Fig. 6 is an enlarged, vertical sectional view, partly in elevation, showing a detailed feature of the invention; and Fig. 7 is a vertical sectional view, partly in elevation, showing a modified regenerating housing.

Referring to Figs. 1 and 2, I have shown a system utilizable for converting hydrocarbons in the presence of contact material adapted, during on-stream operation, to gravitate through a conversion zone and, during regeneration, to gravitate in succession through a plurality of regenerating zones. As illustrated, the aforesaid system may comprise a housing C which defines the conversion or reaction zone, housings B and B1 which defined the respective regenerating zones, and vertical elevators S, R and R1 utilizable, respectively, for conveying spent and regenerated contact material from lower to upper levels.

The conversion housing C and associated apparatus may be of any suitable character. As shown particularly in Fig. 2, there may be supported at the top of the housing C a hopper 1 to which regenerated contact material M is admitted continuously in the manner hereinafter described. Depending from and communicating with the hopper 1 are a plurality of pipes 2 through which the contact material passes to form a gravitating bed of contact material, the lower surface of which may be defined by a tube sheet 3 horizontally supported in the lower portion of the housing C. As the conversion operation proceeds, contact material M is admitted to the housing C as described above and, in bed formation, moves downwardly therethrough under the influence of gravity while a deposit of carbonaceous material is formed thereon.

Any suitable arrangement may be utilized for discharging the spent contact material M from the housing C. To this end and as diagrammatically indicated, a plurality of spaced tube sheets 4 may be secured to the interior surface of the lower end portion of the housing C below the aforesaid tube sheet 3, the extreme lower end portion of said housing C, preferably, being conical as illustrated. A plurality of suitably spaced tubes or pipes 5 open through and depend from each of the tube sheets 3 and 4. As known in the art, the tubes 5 on successively lower tube sheets progressively decrease in number and the internal diameter thereof progressively increases whereby the contact material gravitates through the lower conical end portion of the housing C so as to reach and traverse a main discharge pipe or conduit 6 which should be suitably inclined as illustrated. In known manner, a valve 7 mounted on a shaft 8, Fig. 4, and controlled as hereinafter described is utilized to restrict the gravitating flow of the spent contact material through said conduit 6 for the purpose hereinafter described.

When hydrocarbon material is to be cracked in the housing 1, the contact material C hereinbefore referred to should be catalytic in character and the temperature thereof, upon admission to the housing 1, should range between 800° F. and 1000° F. or higher for example, about 900° F. Any suitable kind of catalytic contact material may thus be utilized such, for example, as activated clay pellets, or synthetic silica-alumina pellets or beads, etc. having suitable major dimensions such as between $\frac{1}{16}$ and $\frac{3}{4}$ of an inch. Other suitable catalysts for cracking include synthetic plural oxide composites, silicious or non-silicious in character and containing for example, zirconia, alumina or beryllia. In lieu of a cracking operation, other types of conversion operations such, for example, as one wherein hydrocarbon material of the character referred to below is desulphurized under known conditions with catalytic contact material of the general character referred to above, or equivalent. Or, reforming or dehydrogenation of naphthas or other normally liquid hydrocarbons may be effected in the presence of the above or other desired types of catalyst, certain of which are well known in the art. In lieu of the conversion operations described above, heavy hydrocarbon material may be vaporized and viscosity-broken in the presence of inert contact material of known character.

During operation with suitable cracking contact material, vapors such, for example, as vaporized gas oil, naphtha, or lighter hydrocarbons having suitable elevated temperature, as in a range from 850° F. to 950° F., are admitted continuously by a pipe 9 to the housing C above the upper surface of the bed of contact material. In the manner hereinafter described, these hydrocarbon vapors, as the conversion operation proceeds, pass concurrently as regards the contact material gravitating through the housing C and, adjacent the lower end of said housing, any suitable arrangement may be provided for disengaging converted vapors from the contact material. To this end, as diagrammatically indicated, the aforesaid tube sheet 3 may support a plurality of tubes 10 which upstand therefrom and open therethrough, the tubes 10 supporting a plurality of suitably arranged channel members 11, or equivalent, which are disposed in inverted relation so that, in known manner, they may be utilized for disengagement of vapors from the contact material, the vapors thereafter entering the tubes 10 by way of passages 10a formed, respectively, therein. A pipe 12 opens through the wall of the housing C below the tube sheet 3 and communicates with the space about the adjacent conical piles of contact material. This pipe 12 has associated therewith a control valve 12a and is adapted to receive and conduit the converted vapors to any suitable destination, not shown. By suitable means, not shown, a suitable gaseous medium, such as steam or flue gases is admitted to the lower portion of the housing C, below the pipe 12 and under pressure above that existing at the level thereof, to prevent passage of hydrocarbon vapors through the conduit 6.

The lower end of the aforesaid conduit 6 opens into the lower end of the housing 13 for the elevator S which may be of conventional character or otherwise as may be desirable. As indicated in Fig. 2, the elevator S may comprise a pair of side-by-side, endless carriers 14 which are supported by suitably mounted upper and lower rotatable members 15, Fig. 4. The carriers 14 are operated continuously by suitable mechanism, not shown, and they have elevator buckets 16 secured thereto in suitable manner. The buckets 16 receive the spent contact material from the lower end of the conduit 6 and elevate the same to the upper end of the elevator housing 13 where it is discharged into the upper end of a downwardly inclined conduit 17 which is suitably connected, in communicating relation, with said upper end of the housing B.

The spent contact material which has been elevated as described immediately above gravitates through the conduit 17 and, in any desired manner, is admitted to the upper end of the regenerating housing B which together with its associated apparatus may be generally of conventional character or otherwise as may be desirable.

Thus, as shown in Figure 4, the aforesaid conduit 17 may extend through the top wall of the housing B at the center thereof so as to discharge the spent contact material on a tube sheet 18 horizontally secured in the top portion of said housing B. Opening through and depending from this tube sheet 18 are a plurality of tubes 19 through which the spent contact material, by action of gravity, passes into and then through the regenerating zone proper which, if desired but not necessarily, may have disposed therein an upper disengager 20 below which is disposed an upper engager 21 having an upper set of cooling coils 22 disposed therebelow.

The disengager 20 and engager 21 may be of any suitable construction and, as herein diagrammatically shown, each may comprise a horizontal pipe 23 fixed transversely in the housing B and intersecting the longitudinal axis thereof, each pipe 23 carrying a plurality of inverted channel members 24 extending horizontally from opposite respective sides thereof.

As known in the art, the housing B, throughout the height thereof, may carry sets of disengagers 20 and engagers 21 alternately arranged with a group of cooling coils 22 disposed between each engager and the adjacent disengager. By each of the engager pipes 23 and the associated channel members 24, air or other suitable regenerating medium is engaged with the gravitating contact material to burn carbonaceous material therefrom with consequent elevation in temperature thereof, the resulting flue gases being disengaged from the contact material at the channel members 24 of the disengager pipes 23 and passed from the housing B by way of the pipes last named. In known manner, a suitable cooling medium, such as water, fused salts or the like is passed through the coils 22 in order to lower the temperature of the contact material after it passes each engager 21.

As the operation proceeds, the contact material M gravitates continuously through the housing B from which it is withdrawn through any suitable draw-off arrangement D which, for example, may be of the character hereinafter described with respect to the housing B1. During passage thereof through the housing B, the contact material is only partially regenerated and, after it leaves said draw-off arrangement, it gravitates through a downwardly inclined pipe or conduit 25 having disposed therein a valve 26 mounted on a shaft 27, Fig. 2. Thereafter, the partially regenerated contact material enters the lower end of the housing 28 for the elevator R which, except for height, may be similar to the elevator S hereinbefore described. By the elevator R, the contact material last named is conveyed upwardly to the inlet end of a downwardly inclined conduit 29 through which said contact material gravitates prior to admission thereof to the upper end of the regenerating housing B1 which, if desired and as herein shown, may correspond mechanically with the regenerating housing B described above. Thus, as shown in Fig. 3, the housing B1 may have associated therewith a tube sheet 18, tubes 19, disengagers 20, engagers 21 and sets of cooling coils 22 all as described above with respect to said housing B. During passage thereof through the housing B1, regeneration of the gravitating contact material is completed to substantial extent and, in this sense, the contact material leaving the housing B1 is hereinafter described as completely regenerated.

In the form of the invention herein shown, although not necessarily, the draw-off arrangement D utilizable for discharging the contact material from the housing B1 (and also from the housing B) may be of the character disclosed in pending application Serial No. 734,680, filed March 14, 1947.

As indicated in Figs. 3 and 5, the aforesaid arrangement comprises a horizontal baffle plate 30 supported by a plurality of symmetrically arranged funnels 31, said baffle plate 30 comprising a plurality of symmetrically arranged vertical passages, groups of which communicate with the respective funnels 31. The funnels 31, in turn, are supported, respectively, by vertical pipes 32, the latter being supported by the bottom wall of said housing B1. The pipes 32 form groups, each of which consists of four pipes, all of these groups being symmetrically related to each other. Each pipe 32 comprises and communicates with an angular, downwardly extending pipe section, the pipe sections of each group of pipes 32 extending toward a common center where, at a common level, they communicate with a vertical pipe 33 all of which are supported by the aforesaid bottom wall of the housing B1. The pipes 33 form symmetrical groups consisting of four pipes each, each pipe 33 comprising and communicating with an angular, downwardly extending pipe section, the pipe sections of each group extending toward a common center, where, at a common level they communicate with a vertical pipe 34. The pipes 34 form a single group of pipes, each of which comprises and communicates with an angular downwardly extending pipe section, all of the latter, at a common level, communicating with a single main pipe or conduit 35, the longitudinal axis of which coincides with the longitudinal axis of the housing B1.

The completely regenerated contact material gravitates from the regenerating zone defined by the housing B1 by way of the described passages in the baffle plate 30, thereafter gravitates through the described pipes and pipe sections and eventually reaches the main pipe 35. All of the contact material gravitates through said main pipe 35 and then through a downwardly inclined pipe or conduit 36 having disposed therein a valve 37 mounted on a shaft 38, Figs. 3 and 6.

The lower end of the conduit 36 opens, in sealed relation, into the lower end of the housing 39 for the elevator R1 which may be similar to the elevator R hereinbefore described. The housing 39 defines a passage which is sealed from the atmosphere so that, in the manner hereinafter described, pressure in excess of that of the atmosphere may be maintained therein. By the elevator R1, the completely regenerated contact material is conveyed upwardly where it is discharged into the upper end of a downwardly inclined conduit 40 which is suitably connected in communicating, sealed relation with the upper end of the elevator housing 39. The completely regenerated contact material which has been elevated as described immediately above gravitates through the conduit 40 from which it enters a hopper 41 and passes therefrom by way of a vertical pipe or conduit 42 which communicates with the hereinbefore described hopper 1 at the top of the housing C.

During operation of the disclosed system, the position of the valve 7, Fig. 4, may be controlled automatically in known manner, for example, as disclosed in application Serial No. 719,730, filed January 2, 1947, in response to change in level of the upper surface of the contact material in the hopper 41. By the valve 7, gravitational movement of the contact material along a path extending from the level thereof in the hopper 41, through the conduit 42, the housing C and the portion of the pipe 6 above said valve 7 is restricted or impeded so that, throughout the length of said path, the contact material moves in solid column fashion. The valve 37, Fig. 6, which, as described above, is disposed in the conduit 36 restricts or impedes gravitational movement of the contact material along a path extending from the level thereof at the top of the housing B1, downwardly through said housing, through the draw-off system illustrated in Figs. 3 and 5 and then through that portion of the conduit 36 above said valve 37. Should it become necessary, the position of this valve may be changed manually in order to vary the rate of movement of the gravitating contact material last named. Due to the described action of the valve 37, the contact material moves in solid column fashion throughout the length of the path described immediately above. As will be understood, the valve 26, which is disposed in the conduit 25, Fig. 2, exercises a similar control on the contact material gravitating through the housing B, the associated draw-off system D and the portion of the conduit 25 above said valve 26.

As will be understood, the hydrocarbon vapors admitted to the housing C, Fig. 2, by way of the pipe 9 are subjected to a definite pressure drop while traversing said housing, the tubes 10, the pipe 12 and such equipment as is connected in circuit therewith. In order to produce the desired concurrent flow of the hydrocarbon vapors with respect to the gravitating contact material in the housing C, it necessarily follows, then, that said hydrocarbon vapors should be admitted to the housing C at a pressure sufficient to overcome the aforesaid pressure drop to suitable degree. At the same time, the operation should be conducted under conditions such that the hydrocarbon vapors do not pass upwardly through the pipe 42.

To this end, a suitable gaseous sealing medium, such as flue gases, steam, or equivalent, is admitted continuously into the upper portion of the housing C above the hopper 1 by way of a pipe 1a, Fig. 2, this sealing medium, by pressure drop effects and/or otherwise as hereinafter described, being maintained within the upper portion of the housing C at a pressure slightly exceeding that of the hydrocarbon vapors in order to produce the desired flow thereof through said housing C. As hereinafter described, the major portion of this sealing medium passes to the atmosphere along a path which is sealed from end to end thereof. This sealed path originates at the lower end of the vertical conduit 42 through which it extends, thence by way of the hopper 41, conduit 40, housing 39 of elevator R1, conduit 36, draw-off system D, through the lower end of the housing B1 to the lowermost disengager 20, Fig. 3.

Initially, the aforesaid major portion of the sealing medium passes, counter-current to the descending contact material, upwardly along that part of the sealed path defined by the vertical conduit 42, the hopper 41 and the pipe 40. By reason of the described restricted or impeded flow of the contact material traversing the vertical conduit 42, the sealing medium is subjected to a pressure drop which is determined by or which is effective through a vertical distance d, Fig. 2.

In connection with the foregoing, the pressure drop developed in the hopper 41 is insignificant by reason of the substantially larger diameter thereof compared with that of the pipe 42. Moreover, the contact material traversing the pipe 40 falls freely under the influence of gravity except for frictional retardation on the interior surface thereof and, accordingly, substantially no pressure drop is developed in response to movement of the sealing medium through the contact material traversing this pipe.

After passage of the aforesaid major portion of the sealing medium along that part of the sealed path described above, said sealing medium enters and passes downwardly through the housing 39 of the elevator R1 which, as stated, is sealed from the atmosphere. Thereupon, as described below, the sealing medium leaves the bottom of said elevator housing, passes upwardly through the pipe 36 and, above the valve 37, traverses the remaining part of the sealed path, namely, that portion of the pipe 36 above said valve 37, the draw-off system D and the bed or column of contact material in the housing B1 below the lowermost disengager 20. By reason of the described restricted or impeded flow of the contact material along the part of the sealed path last noted, the sealing medium is subjected to a pressure drop which is determined by or which is effective through a vertical distance $d_1$, Fig. 3. In this connection and as hereinbefore described with respect to the hopper 41, the pressure drop developed in the bottom portion of the housing B1 below the lowermost disengager 20 is insignificant by reason of the large cross-sectional area of said housing compared with that of the pipe 36, for example.

In view of the foregoing, it follows that the sealing medium which is admitted to the conversion housing C by way of the pipe 1a is subjected to a pressure drop which is effective, first, throughout that portion of the sealed path above said conversion housing C (as indicated by the vertical distance d, Fig. 2) and, second, throughout that portion of the sealed path extending principally below the regenerating housing B1 (as indicated by the vertical distance $d_1$, Fig. 3).

In the event that the combined vertical end-to-end length of the two pressure drop paths referred to above is insufficient to develop the required pressure relation between the sealing medium and the hydrocarbon vapors in the upper portion of the housing C, the pressure of said sealing medium may be increased, in accordance with my invention, in the manner described below. To this end, the disengager pipes 23 of the regenerating housing B1, Fig. 3, may be connected together by a pipe 43 having a valve 44 disposed therein. Depending on the setting of the valve 44, the pressure interiorly of said housing B1 may be maintained to suitable extent in excess of that of the atmosphere. In other words, with an arrangement of this character, the regenerating operation in the housing B1 proceeds, not at substantially atmospheric pressure, but at a selected higher pressure. As will be understood, it is characteristic of this operation that, principally, the sealing medium along with the flue gases resulting from the regenerating operation pass to the atmosphere by way of the pipe 43. In connection with the foregoing, it will be understood that, in the housing B, the regenerating operation is conducted at a lower pressure than in the housing B1 and, with the disclosed housing B, the pressure interiorly thereof is substantially that of the atmosphere.

Accordingly, with the system of my invention, the combined vertical end-to-end length of the two pressure drop paths indicated by the respective distances d and $d_1$ develops the total pressure drop to which the sealing medium is subjected and this, to substantial extent, determines the pressure under which the sealing medium exists in the upper portion of the housing C. In addition, the pressure last noted is supplemented to a degree depending on the extent to which the pressure interiorly of the housing B1 is in excess of that of the atmosphere and this, when the conditions are proper, may readily be controlled by the valve 44 to cause the pressure of the sealing medium in the zone defined by the upper portion of the housing C to be slightly in excess of the hydrocarbon vapor pressure in said zone.

An indicated in Fig. 3, the contact material in the regenerating housing B1 moves in solid bed or column fashion above the topmost disengager 20 throughout a vertical distance $d2$. In the event that the pressure in the conduit 29 or the housing 28 of the elevator R is at atmospheric value, gases may pass from the housing B1 to the atmosphere either by way of the pipe 43 or the conduit 29, the extent to which these gases traverse the conduit 29 being determined by the setting of the valve 44. Under these circumstances, the pressure drop which is developed throughout the vertical distance $d2$ is significant as regards the extent to which the pressure interiorly of said housing B1 may exceed that of the atmosphere. If the pressure last noted is insufficiently high to supplement to a desired degree the effect of the aforesaid pressure drop paths on the sealing medium, the arrangement may be such that the conduit 29, the housing 28 of the elevator R, the conduit 25, the draw-off system D of the housing B and the portion of said last named housing extending upwardly to the lowermost disengager 20 thereof define a path which from end-to-end thereof is sealed from the atmosphere or substantially so. Accordingly, under the conditions last recited, gases passing from the housing B1 by way of the conduit 29 are subjected to a pressure drop which is effective throughout the vertical distance $d2$, Fig. 3, and the vertical distance $d3$, Fig. 2. The presence of said last named pressure drop, obviously, increases to substantial extent the pressure which may be developed in the housing B1 responsive to setting of the valve 44, the pressure thus developed being sufficient, in accordance with the invention, to supplement the effect of the two pressure drop paths and maintain the sealing medium interiorly of the upper portion of the housing C at the required pressure.

Alternatively to the foregoing and in accordance with a broader aspect of the invention, the pressure which is thus developed in the regenerating housing B1 may be utilized solely (entirely without the aid of pressure drop in the sealed path traversed by the sealing medium) to maintain said sealing medium interiorly of the upper portion of the housing C at the required pressure. In this connection, it shall be understood that, in accordance with the invention, the pressurized regenerating housing may be one wherein the regenerating operation is effected either partially or entirely provided, of course, that the pressure interiorly thereof is utilized as hereinbefore described to either partially or entirely maintain the sealing medium at the desired pressure in the upper portion of the conversion housing C.

In view of the foregoing, it will be understood that, in accordance with my invention, the pressure of the sealing medium in the upper portion of the conversion housing C may be controlled by three factors, namely, the pressure drop to which said sealing medium is subjected throughout the vertical distance $d$, Fig. 2, throughout the vertical distance $d1$, Fig. 3, and, in addition, the extent to which the pressure interiorly of the regenerating housing B1 is in excess of that of the atmosphere. With respect to the two factors last noted, there is considerable latitude as regards the magnitude which may be imparted thereto and this applies particularly to the vertical distance $d1$ because, obviously, if this distance is insufficient for the intended purpose, the housing B1 may be positioned substantially higher than as shown in Fig. 3 in order to substantially increase said vertical distance $d1$ and thereby obtain increased pressure drop. By reason of this latitude, it becomes evident that, while subjecting the sealing medium to the proper pressure in the upper portion of the housing C, the vertical distance $d$, Fig. 2, may have a desired small magnitude, for example, as shown or such magnitude may even be nil or substantially so. Hence, the height of the elevator R1 for transporting the completely regenerated contact material upwardly for subsequent passage to the conversion housing C need be only such as is required by the over-all height of the conversion system per se, namely, the combined height of said housing C, the hopper 41 and the vertical height required for the inclined pipes 6 and 40. In accordance with a feature of the present invention and as hereinafter described, the height of said elevator R1 which supplies completely regenerated contact material to the conversion housing C is controlling as regards the over-all height of the complete conversion-regenerating system. Since the above described over-all height of the conversion system per se, except perhaps for the hopper 41 together with the pipes 6 and 40, is substantially an irreducible minimum, it follows that, by my invention, the over-all height of a complete conversion-regenerating system of the general character described is reduced in a manner corresponding to that noted immediately above.

In prior practice, as regards a conversion-regenerating system of the general character herein disclosed, it is customary for the regenerated contact material to pass from the upper end of its elevator by way of an inclined pipe which communicates with a surge hopper (such as the herein disclosed hopper 41) communicating, in turn, with a vertical pipe which extends into the upper end of the conversion housing. This pipe has vertical height below the surge hopper sufficient to cause the sealing medium which passes upwardly therethrough to be subjected to a pressure drop adequate to develop the desired pressure relation between the sealing medium and the hydrocarbon vapors in the upper portion of the conversion housing. In other words, with this prior art arrangement, the required pressure drop of the sealing medium is developed solely in said vertical pipe and the vertical height thereof together with that of the surge hopper and the inclined pipe admitting contact material thereto determines the height of the elevator which supplies regenerated contact material to said last named inclined pipe. Often, in prior practice, in order for the necessary pressure relation to be developed between the sealing medium and the hydrocarbon vapors in the upper portion of the conversion housing, the height of the aforesaid vertical pipe (wherein all of the pressure drop is developed) causes the height of the elevator for the regenerated contact material to be substantially greater, for example, twenty-five to fifty feet greater than is required by any other part of the system.

In an application of Louis J. Kelly filed of even date herewith, Serial No. 794,956, filed December 31, 1947, now Patent No. 2,566,896, a conversion-regenerating system is disclosed wherein, while subjecting the sealing medium to the necessary pressure drop, the height of the aforesaid vertical pipe is at least substantially reduced. As a result, the height of the elevator for the regenerated contact material is reduced in a corresponding manner and the extent of this reduction may be such that the elevator last named is no longer controlling as regards the over-all height of the complete system.

In an application filed by me of even date herewith Serial No. 795,013, filed December 31, 1947, now Patent No. 2,593,404, a conversion-regenerating system is disclosed wherein the sealing medium is subjected to all or a desired part of the necessary pressure drop while traversing a pipe or conduit through which regenerated contact material gravitates after elevation thereof to the inlet end of said pipe or conduit. Here again, the height of the elevator for supplying regenerated contact material to the conversion housing may be reduced to such extent that it is no longer controlling as regards the over-all height of the complete system.

In each of the applications referred to above, then, the height of the elevator for supplying regenerated contact material to the conversion housing may be such that it is not controlling as regards the over-all height of the complete system. If so, the control as regards over-all height is transferred to the elevator for supplying spent contact material to the regenerating housing. However, when a single regenerating housing is utilized as disclosed in said applications, such over-all height remains at a substantial magnitude, this being true by reason of the fact that, in such prior practice, the height of the single regenerating housing is often at least approximately twice the height of the associated conversion housing, or more.

In accordance with one phase of the present invention and as previously disclosed herein, regeneration of the contact material is effected in a pair of housings rather than a single housing. Accordingly, the height of each housing forming the pair thereof may be reduced to substantial extent, for example, approximately one-half or somewhat greater, compared with that of the single housing. The pair of housings are disposed generally in side-by-side relation, but not necessarily at the same level, and, as clearly appears, the height of the respective elevators S and R for supplying contact material thereto is such that neither of them is controlling as regards the over-all height of the complete system. In view of this condition and further, due to the fact that, as stated, the over-all height of the disclosed conversion system per se may be and preferably is substantially an irreducible minimum, it follows that the over-all height of the complete conversion-regenerating system likewise is substantially an irreducible minimum, this being true even though the height of the elevator R1 for supplying regenerated contact material to the conversion housing C is somewhat greater than that of said elevators S and R. Substantial reduction in the over-all height of a complete conversion-regeneration system is desirable because reducing the expense, decreasing the vertical height of the elevator spans and the gravitating beds or columns of contact material with resultant simplification of the mechanical construction, increase in efficiency of operation and lessening the hazard of air travel particularly when the system is located in the immediate vicinity of an airport.

As previously described herein, the regenerating housing B1, Fig. 3, has alternately arranged disengagers 20 and engagers 21 associated therewith. However, the invention is not to be thus limited. Thus, as shown in Fig. 7, a regenerating housing B2 (to be transversed by the partially regenerated contact material) may be utilized in lieu of the housing B1, said housing B2 having an engager 21 associated therewith adjacent the bottom of the bed of gravitating contact material. In operation, the regenerating medium is admitted to the housing B2 by way of said engager 21 and flows upwardly counter-current to the descending contact material while burning the carbonaceous deposit therefrom, the resulting flue gases being disengaged from said contact material at the upper surface thereof and passed from the housing B2 by way of a conduit 46. In connection with this operation, it is to be understood that the regenerating medium is delivered to the engager 21 of Fig. 7 at a pressure sufficient to effect passage thereof upwardly through the bed of contact material and, accordingly, it follows that the pressure within said housing B2 is substantially in excess of that of the atmosphere. It is also to be understood that the described sealing medium passes through the draw-off system D of Fig. 7 and arrives at said last named engager 21 at a pressure only slightly exceeding that at which the regenerating medium is delivered thereto.

The excess pressure in the housing B2 noted immediately above, to greater extent than with the housing B1, supplements the total pressure drop to which the sealing medium is subjected in order to cause the pressure thereof to have a desired magnitude in the zone defined by the upper portion of the conversion housing. It will be understood, as hereinbefore described with respect to the valve 44, that the conduit 46 may have associated therewith a valve, not shown, which may be set as desired in order to further increase the pressure which exists interiorly of the housing B2 during the regenerating operation.

Further in accordance with the invention and in addition to the foregoing, another housing B2 of the character shown in Fig. 7 which is to be traversed by the spent or non-regenerated contact material) may be substituted for the housing B. If so, a pair of the housings B2 are disposed in series and the pressure in excess of that of the atmosphere which is maintained in that housing B2 traversed by the spent or non-regenerated contact material supplements the aforesaid excess pressure which is maintained in that housing B2 traversed by the partially regenerated contact material and the total pressure drop to which the sealing medium is subjected.

It shall be understood that, except as set forth in claim language, there is to be no limitation of the invention to the disclosed arrangement involving admission of the gaseous sealing medium to the housing C by way of the conduit 1a. Thus, within a broader aspect of the invention, the gaseous sealing medium may be admitted to the described sealed path at any desired location provided, first, that said gaseous medium is present throughout the length thereof so as to be maintained, in the upper part of the housing C, at pressure slightly greater than that of the hydrocarbon vapors and, second, that it passes through the contact material gravitating in solid column fashion in order to develop pressure drop for the purpose stated.

The invention has been hereinbefore described with respect to a pair of regenerating housings through which the contact material passes in series, at least one of these housing contributing as regards the pressure at which the described sealing medium is maintained in the upper portion of the conversion housing C. However, from all of its aspects, the invention is not to be thus limited.

Thus, the invention is characterized by the aforesaid pair of regenerating housings which, together with the respective elevators for supplying contact material thereto, are disposed generally in side-by-side relation, the same also holding true as regards the conversion housing and the elevator for supplying regenerated contact material thereto. The provision of an assembly of units of this character, independently of pressurized regenerating housing and other features of the invention, is advantageous because substantially, decreasing the height of many of the units as well as the over-all height of the complete system with resultant improvement in operating conditions and life expectancy of various parts of said system. Again, the invention is characterized by regenerating housings that are traversed in series by contact material, the regenerating operation being completed in a housing having higher pressure maintained therein than in a housing previously traversed by said contact material. This is advantageous because the partially regenerated contact material (from which it is more difficult to remove the remaining carbonaceous material) is subjected to combustion conditions in the high pressure regenerating housing which are more effective than those which occur in a lower pressure regenerating housing. Still further, the higher pressure housing B1, utilizable as it is for regenerating gravitating contact material, in combination with the conversion housing C and the paths for contact material extending therebetween forms an arrangement which is useful in the general art appertaining thereto.

When contact material gravitates in an impeded or restricted manner through an inclined pipe, it is necessary for this pipe to be related to a horizontal plane by an angle of at least approximately 45 degrees. As regards the disclosed system, the foregoing applies to the pipes 6, 25 and 36. When contact material traversing an inclined pipe falls freely under the influence of gravity except for frictional retardation on the interior surface thereof, the angle of inclination may be somewhat less than as stated above. This applies to the pipes 17, 29 and 40.

It will be understood that the invention is not to be limited to the disclosed conversion operation which involves admission of hydrocarbon vapors to the top of the housing C for passage therethrough in concurrent relation as regards the gravitating contact material. Obviously, the invention is applicable to conversion operations of other types such, for example, as one wherein hydrocarbon vapors pass countercurrent as regards the gravitating contact material or wherein the charge, partly in liquid phase, is admitted into the upper portion of the conversion housing for downward passage therethrough along with hydrocarbon vapors.

Some of the appended claims include references to sealed path arrangements such, for example, as "a second path sealed from end-to-end thereof." It shall be understood that such references are intended to be descriptive of sealed path arrangements wherein the pressure of the gases therein is maintained in excess of that of the atmosphere even though some of the gases may pass to the atmosphere, for example, through a throttled vent.

Obviously many modifications and variations of the invention as hereinbefore set forth may be made without departing from the spirit and scope thereof and therefore only such limitations should be imposed as are indicated in the appended claims.

I claim:

1. In a cyclic hydrocarbon conversion process in which solid contact material gravitates through separate conversion and regeneration zones and in which elevated pressure exists at the upper end of said conversion zone, the method which comprises the steps of: passing said contact material along a first continuous path extending downwardly from the outlet of said conversion zone, then upwardly to a point above the inlet of a first regeneration zone maintained at a pressure substantially lower than the aforementioned pressure in said conversion zone, and downwardly into and through said first regeneration zone; partially regenerating said contact material in said first regeneration zone; passing partially regenerated contact material from said first regeneration zone along a second continuous path originating therein and extending downwardly from the outlet thereof, then upwardly to a point above the inlet of a second regeneration zone maintained at a pressure intermediate the aforementioned pressures, and downwardly into and through said second regeneration zone; completing the desired regeneration within said second regeneration zone; passing regenerated contact material from said second regeneration zone along a third continuous path originating therein and extending downwardly from the outlet thereof, then upwardly to a point above the inlet to said conversion zone, and downwardly into and through the same; introducing a gaseous sealing medium into said upper end of said conversion zone at a pressure at least slightly higher than said elevated pressure and passing said sealing medium countercurrently to the movement of said contact material throughout the length of said third continuous path, said third continuous path being sealed from end to end so that the pressure of said sealing medium within the upper end of said conversion zone is maintained at least in part by said intermediate pressure within of said second regeneration zone.

2. A process as defined in claim 1 in which the pressure of said sealing medium within the upper end of said conversion zone is maintained in part also by reason of the pressure drop to which said sealing medium is subjected in passing through at least a portion of the contact material gravitating along said third continuous path.

3. A process as defined in claim 2 in which said third continuous path originates in the upper end of said second regeneration zone.

4. A process as defined in claim 3 in which the portion of said third continuous path contained within said second regeneration zone provides at least a portion of said pressure drop.

5. A process as defined in claim 1 in which said second continuous path for the passage of said contact material also is sealed from the atmosphere from end to end, so that said intermediate pressure within said second regenerating zone is maintained at least in part by reason of the pressure drop effect through at least a portion of the contact material gravitating along said second continuous path.

JOHN W. BARKER.

REFERENCES CITED

The following references are of record in the file of this patent:

UNITED STATES PATENTS

| Number | Name | Date |
|---|---|---|
| 1,822,303 | Miller | Sept. 8, 1931 |
| 2,290,580 | Degnen et al. | July 21, 1942 |
| 2,438,261 | Utterback | Mar. 23, 1948 |
| 2,443,180 | Bergstrom | June 15, 1948 |
| 2,443,412 | Bergstrom et al. | June 15, 1948 |
| 2,444,128 | Anderson | June 29, 1948 |
| 2,458,433 | Simpson | Jan. 4, 1949 |

FOREIGN PATENTS

| Number | Country | Date |
|---|---|---|
| 552,334 | Great Britain | Apr. 2, 1943 |